(12) United States Patent
Raueiser

(10) Patent No.: US 7,753,242 B2
(45) Date of Patent: Jul. 13, 2010

(54) SUCTION ROLLER SYSTEM

(75) Inventor: Reinhard Raueiser, Mueden (DE)

(73) Assignee: Winkler + Duennebier AG, Neuwied (DE)

( * ) Notice: Subject to any disclaimer, the term of this patent is extended or adjusted under 35 U.S.C. 154(b) by 0 days.

(21) Appl. No.: 12/290,435

(22) Filed: Oct. 30, 2008

(65) Prior Publication Data

US 2009/0101687 A1    Apr. 23, 2009

(51) Int. Cl.
    B65H 20/12    (2006.01)
    B65H 27/00    (2006.01)
(52) U.S. Cl. ............ 226/95; 242/615.11; 493/917
(58) Field of Classification Search ............ 226/95, 226/97.3, 193, 196.1; 242/615.11; 493/917, 493/186, 267, 454, 429, 450
    See application file for complete search history.

(56) References Cited

U.S. PATENT DOCUMENTS 4,254,947 A * 3/1981 Trogan ............... 270/39.07
4,403,847 A * 9/1983 Chrestensen ............ 399/305
4,998,715 A * 3/1991 Milan et al. ............ 271/297
5,358,163 A * 10/1994 Naka .................. 226/95
6,205,899 B1 * 3/2001 Blumle et al. ........... 83/98
6,488,194 B1 * 12/2002 Couturier .............. 226/95
6,685,616 B2   2/2004 Raueiser
6,786,449 B2 * 9/2004 Marcle-Geler et al. . 242/615.12

FOREIGN PATENT DOCUMENTS

| DE | 29 43 562 | 5/1981 |
|---|---|---|
| DE | 100 43 517 | 3/2002 |
| DE | 10 2005 062 348 | 7/2007 |

* cited by examiner

*Primary Examiner*—Evan H Langdon
(74) *Attorney, Agent, or Firm*—Collard & Roe, P.C.

(57) ABSTRACT

A suction roller system includes a suction roller and a control head having a ventilation zone situated at a face side of the suction roller. The suction roller system allows rapid ventilation of the suction bores situated on the face side opposite the control head via a cost-advantageous and space-saving expansion. For this purpose, the suction roller is equipped, on the second face side, with a closure plate having an opening that corresponds to the ventilation zone.

4 Claims, 3 Drawing Sheets

SUCTION ROLLER SYSTEM

BACKGROUND OF THE INVENTION

1. Field of the Invention

The present invention relates to a suction roller system including a suction roller and a control head having a ventilation zone situated at a face side of the suction roller.

2. The Prior Art

A control head for controlling the suction stretch of a suction roller is known from the German patent DE 2 943 562 C2 and from the reference DE 10 2005 062 348 A1; the suction roller is mounted so as to rotate and rests, with one face side, against a face side of the control head having at least one control channel. The suction roller has at least one longitudinal channel that ends on the face side and extends coaxially to supply suction bores that extend crosswise to the roller surface with at least a partial vacuum.

In fast-running operation, the partial vacuum must be produced, and also canceled out again, very rapidly over the entire width of the suction roller, in each instance. In this connection, it can happen that the suction bores in the roller surface that are situated close to the opposite face side of the suction roller, which is usually closed, are not ventilated in timely manner, or ventilated only insufficiently by the control head. As a result, material residues in the region of the suction roller that lies opposite the control head remain adhered to it, and are not separated from the suction roller as desired, by ventilation of the suction roller.

A common alternative for solving this problem is to affix a second control head on the opposite face side of the suction roller, which is otherwise closed. This arrangement, however, is very cost-intensive. There is also insufficient space available in all suction roller systems for a second control head. Furthermore, the second suction head makes it more difficult to remove the suction roller, which is necessary for cleaning it.

SUMMARY OF THE INVENTION

It is an object of the present invention, therefore, to provide a suction roller system that allows rapid ventilation of the suction bores situated on the face side opposite the control head by means of a cost-advantageous and space-saving expansion. A further object is to permit retrofitting of existing suction roller systems with the new system in the simplest possible manner.

These and other objects are achieved, according to the invention, by equipping a suction roller on a second face side with a closure plate having an opening that corresponds to the ventilation zone.

The invention proceeds from the deliberation that another ventilation source should be present for reliable ventilation of the suction bores that are situated in a region that extends in a face side that lies opposite the suction head. Because the pressure differences to be bridged during incoming and outgoing ventilation are slight, the additional feed of atmospheric air during ventilation of the suction bores should be sufficient. In this connection, such a feed is particularly supposed to take place in the regions in which the suction head cannot guarantee sufficient and rapid ventilation. For this reason, the face side that lies opposite the suction head is provided with a closure plate that possesses an opening. Atmospheric air flows through this opening, for supportive ventilation, into the ventilation channels situated in the suction roller. In this way, it is assured that only the ventilation channels in the suction roller that are actually in an air-conducting connection with the ventilation zone of the suction head at that moment are supplied with the additional ambient air.

To avoid a steep-flank partial vacuum surge that might occur, and the resulting loud bang that is caused by sudden ventilation of the ventilation channels by the opening situated in the closure plate, the opening is designed to have a width that narrows counter to the direction of rotation of the roller. A teardrop-shaped opening, in particular, leads to a significant reduction in the noise level.

In order to allow simple and space-saving installation of the closure plate, the closure plate is fixed in place on the housing of the suction roller system by means of pins. In an advantageous embodiment, in this connection, the face side that borders on the closure plate has a number of magnets. By way of these magnets on the face side of the suction roller, and the vacuum in the suction channels, the closure plate is held on the face side without any additional atmospheric air being able to penetrate between the closure plate and the face side of the suction roller. At the same time, however, rotation of the suction roller is not impaired by the connection with the closure plate fixed in place on the housing. To reduce the friction, the contact surfaces can be provided with friction-reducing coatings.

In an alternative, advantageous embodiment, a ventilation chamber or partial vacuum chamber can border on the side of the closure plate that faces away from the suction roller. This chamber would allow additional ventilation not only with atmospheric air, but also with compressed air, or an additional vacuum support. A further development of such a closure plate into an independent control head is therefore possible.

The advantages that can be achieved with the invention particularly include making possible rapid and reliable ventilation of also those suction bores that are situated in the region of the face side that lies opposite the control head. Such ventilation occurs by means of a closure plate having an opening. Furthermore, the closure plate allows rapid replacement of the suction roller, because the closure plate is easy to remove. The closure plate is pressed over the pin heads by bending it slightly, and disconnected. Subsequently, it can easily be taken off the magnets in the face side of the suction roller.

Furthermore, functional possibilities that are similar to a second control head result from the connection of the closure plate with an additional ventilation chamber. A reduction in noise level is achieved by means of the special shaping of the opening of the closure plate.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENTS

Figure 1:
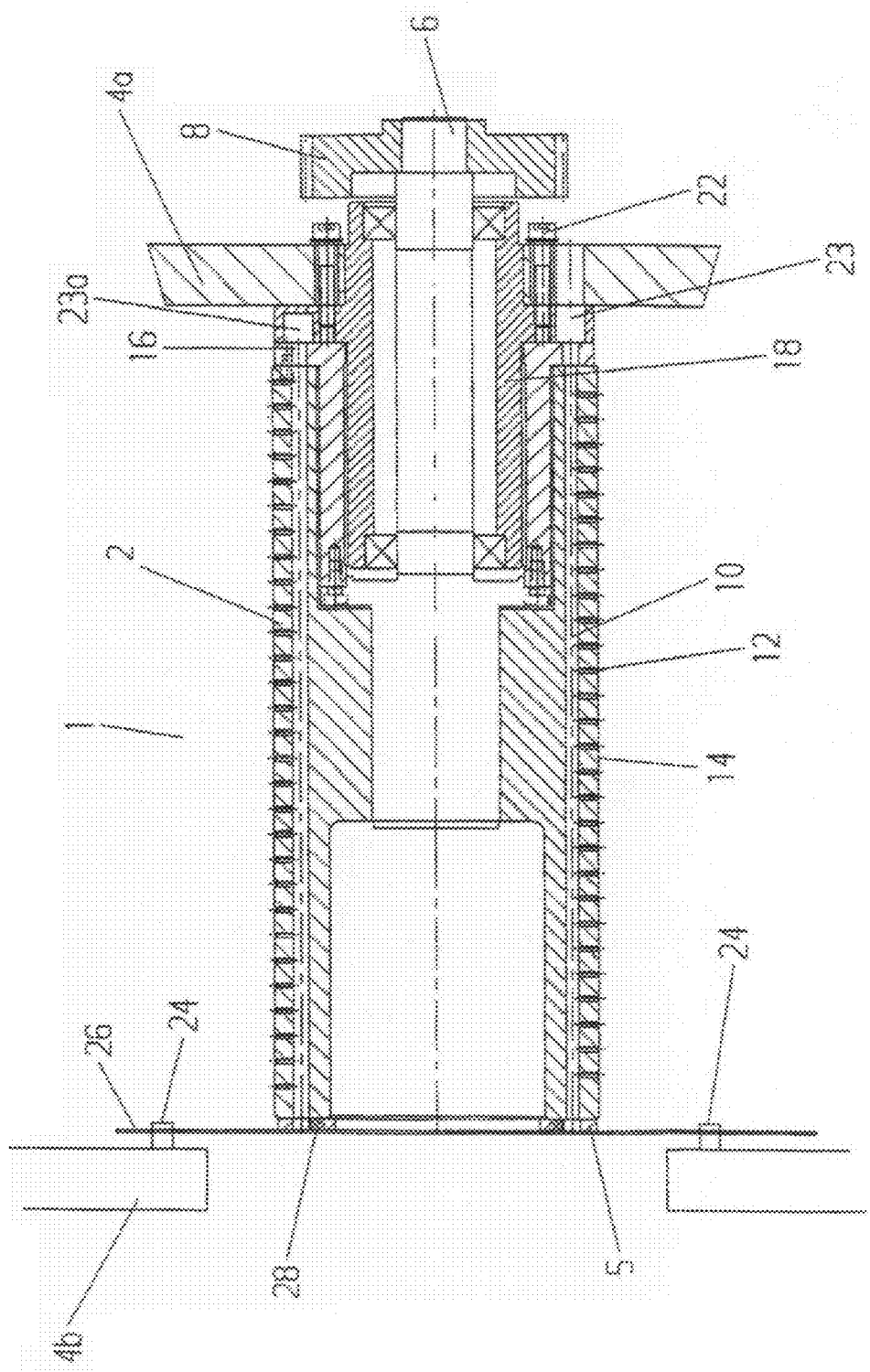
FIG. 1 shows a suction roller system with a suction roller and a control head, and a closure plate mounted on a face side.

Referring now in detail to the drawings, in the exemplary embodiment of a suction roller system 1 shown in FIG. 1, a suction roller 2 is mounted in a machine frame 4a, using a shaft 6, so as to rotate freely, and is driven using a gear wheel 8. The suction roller has at least one suction channel 10, e.g. in the form of a longitudinal bore, from which suction bores 12 extend towards the surface 14 of suction roller 2, in the number and shape required, in each instance. Each suction channel 10 ends in a suction opening 16 at the end on the control head side. This suction opening 16 lies in a face surface of the suction roller 2.

With its face surface, suction roller 2 lies against a control head 18, which also has a face surface on the suction roller side, sliding on it or without contact, and in essentially airtight manner. Control head 18 is disposed in stationary manner and does not rotate. Fixation of control head 18 takes place by means of the screws 22.

Because the precise function of a control head 18 is sufficiently known to a person skilled in the art, the method of functioning will not be discussed any further here.

On the face side of the suction roller that lies opposite control head 18, a closure plate 26 is held on suction roller 2 on the basis of the magnetic attraction force of a number of magnets 28 placed on the face side of the suction roller 2, and fixed in place relative to suction roller by means of pins in the machine frame. An opening 30 (FIG. 2) in closure plate 26, which is placed to correspond with the ventilation zone 23 of control head 18, supplies suction channels 10, 23a to be ventilated with atmospheric air, at the same time, i.e. additionally.

Sufficient ventilation of suction bores 12 in the vicinity of the face side of suction roller 2 that lies opposite control head 18 is made possible by means of opening 30 in closure plate 26.

Figure 2:
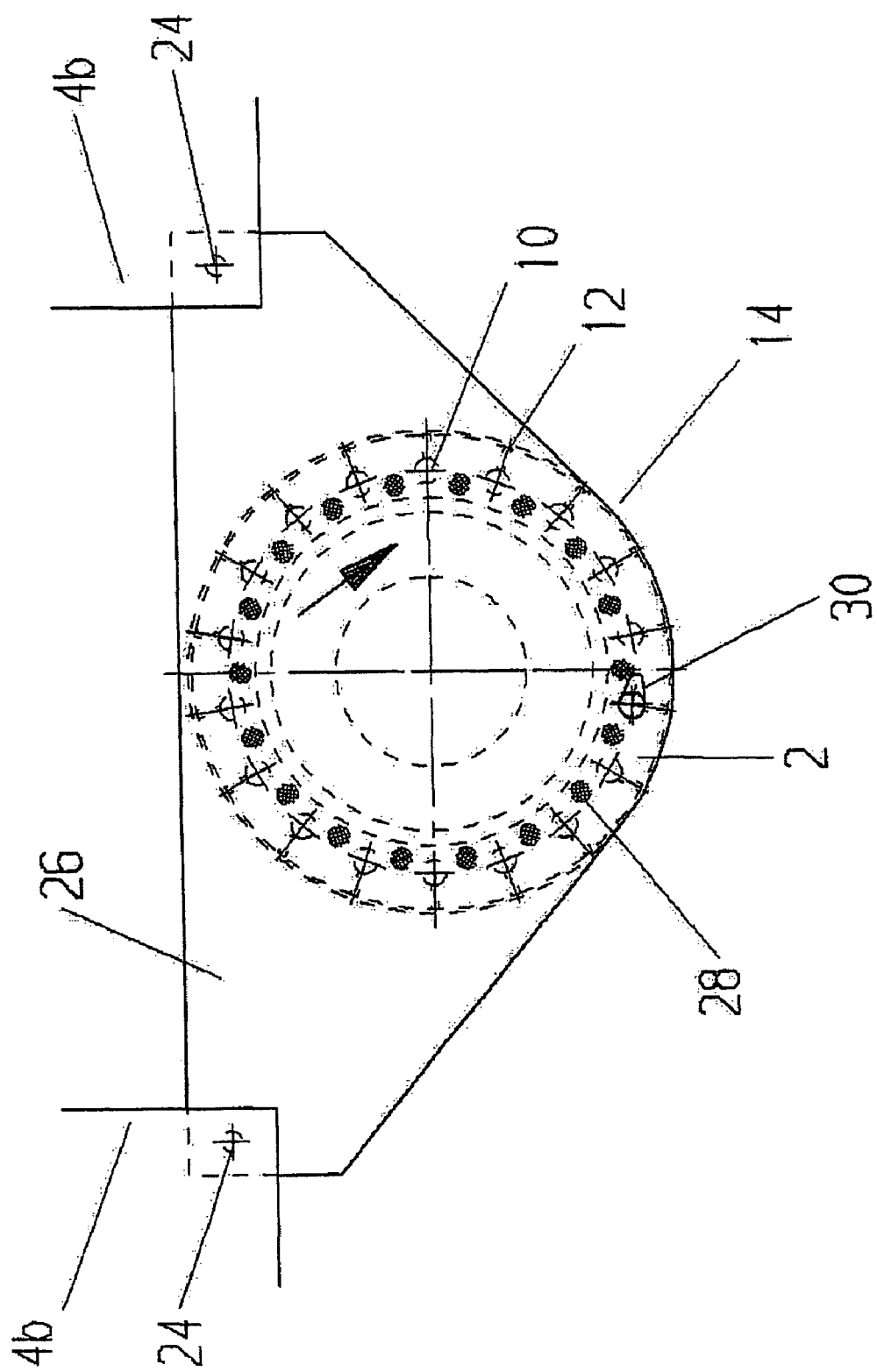
FIG. 2 is a side view of a suction roller system with an installed closure plate.

A side view of suction roller system 1, with closure plate 26 installed, is shown again in greater detail in FIG. 2. In this connection, closure plate 26 is mounted on machine frame 4b of suction roller system 1 by means of two pins 24, and thereby fixed in position. Suction roller 2 has a number of symmetrically distributed magnets 28 on the face side, which hold the closure plate on the face side of suction roller 2, without thereby impairing the rotational movement of suction roller 2. At the same time, the result is achieved that no atmospheric air penetrates into suction channels 10 unintentionally, by way of an interstice between closure plate 26 and suction roller 2. These suction channels 10 are also symmetrically distributed on the edge of suction roller 2, and have a connection channel with suction bores 12 situated on surface 14 of suction roller 2.

Opening 30 situated on closure plate 26 is placed to correspond to ventilation zone 23 of control head 18 and suction channels 10. In this way, the result is achieved that a suction channel 10 that is situated at the ventilation position is supplied with atmospheric air by way of opening 30 on closure plate 26, in addition to ventilation by means of control head 18. This arrangement allows rapid ventilation of suction bores 12 situated in the vicinity of closure plate 26. The configuration of opening 30 as a teardrop shape has the advantage that the formation of steep-flank partial vacuum surges and thus the formation of an undesirable noise level at high speeds of rotation of suction roller 2 are suppressed.

Figure 3:
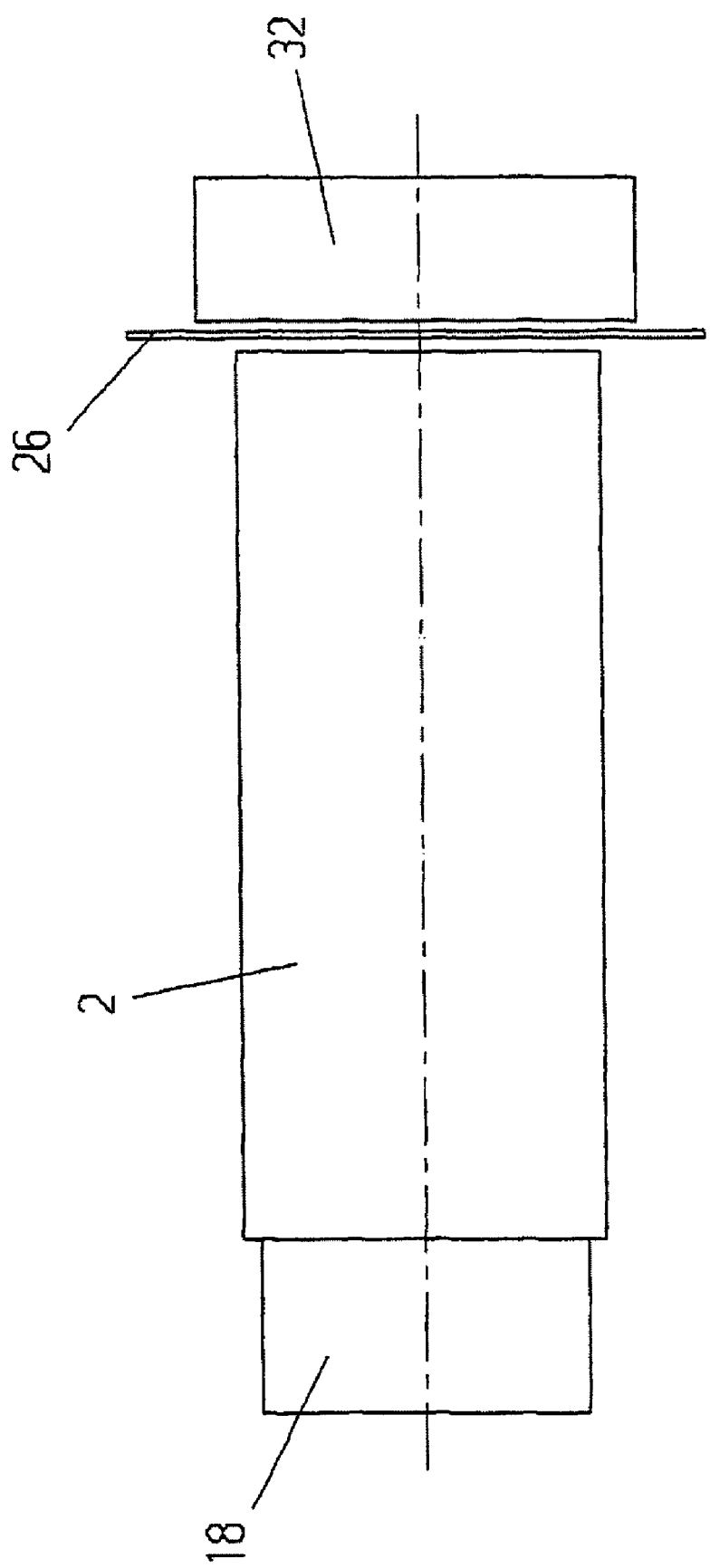
FIG. 3 is a schematic representation of a suction roller system having a closure plate with an adjacent ventilation chamber.

A schematic drawing of a suction roller system 1 having a closure plate 26 and a connected ventilation chamber 32 is shown in FIG. 3. In this connection, the figure shows a suction roller 2 having a control head 18 connected at one face side, and a closure plate 26 that borders on the opposite face side. A ventilation chamber 32 borders on the plate on the side facing away from suction roller 2. Using this ventilation chamber 32, compressed air can be actively passed into suction channels 10, by way of an opening 30 in closure plate 26. In this way, it is possible to actively support the ventilation function of control head 18, or even to take it over completely. Furthermore, an additional vacuum supply is also possible.

Although only a few embodiments of the present invention have been shown and described, it is to be understood that many changes and modifications may be made thereunto without departing from the spirit and scope of the invention.

What is claimed is:

1. A suction roller system comprising:
   (a) a rotating suction roller having suction channels and a first face side and a second face side opposite to said first face side, said suction channels starting at the first face side, extending through the axial length of the suction roller and ending at the second face side;
   (b) a control head situated at the first face side of the suction roller, said control head comprising a suction zone and a ventilation zone separate from said suction zone; and
   (c) a closure plate provided on the second face side of the suction roller, said closure plate closing at the second face side those suction channels that are at the first face side actually in air-conducting connection with said suction zone of said control head and said closure elate having an opening which is placed to correspond with the ventilation zone, so that at the second face side additional ambient air may flow through said opening into those suction channels that are at the first face side actually in air-conducting connection with said ventilation zone of said control head.

2. The suction roller system according to claim 1, wherein the opening of the closure plate has a width that narrows counter to a direction of rotation of the suction roller.

3. The suction roller system according to claim 1, wherein the second face side of the suction roller corresponds to the closure plate and has a plurality of magnets.

4. The suction roller system according to claim 1, further comprising a ventilation chamber bordering on a side of the closure plate that faces away from the suction roller.

* * * * *